Feb. 10, 1925.
F. H. WOOD
PACKING GLAND
Filed Dec. 31, 1923    2 Sheets-Sheet 1
1,526,035
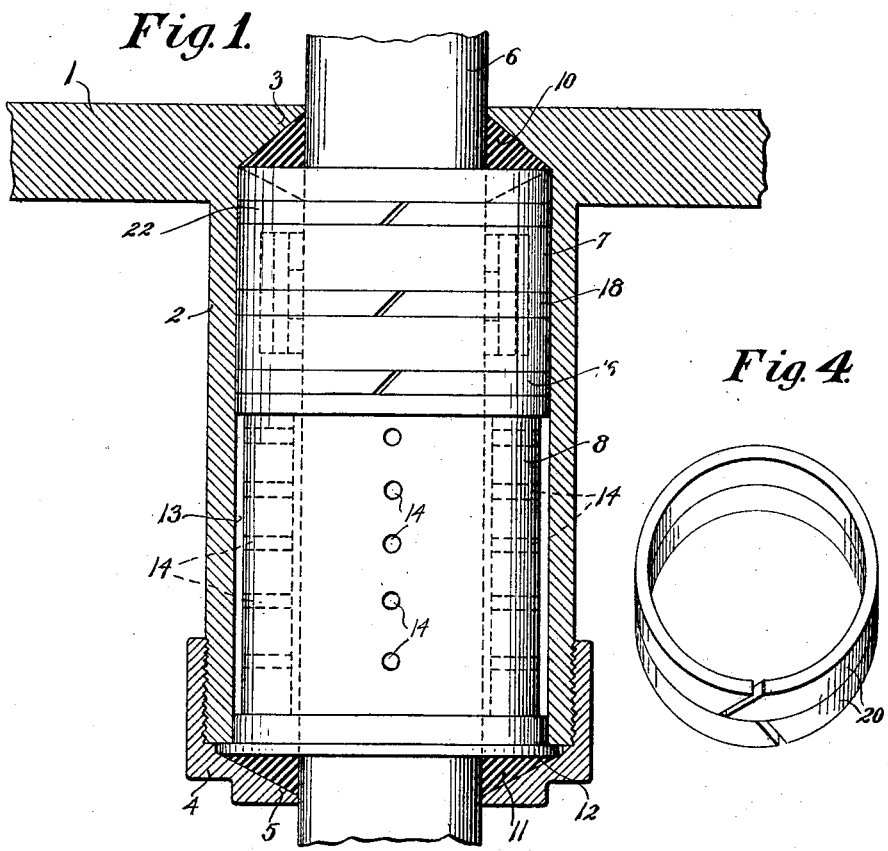
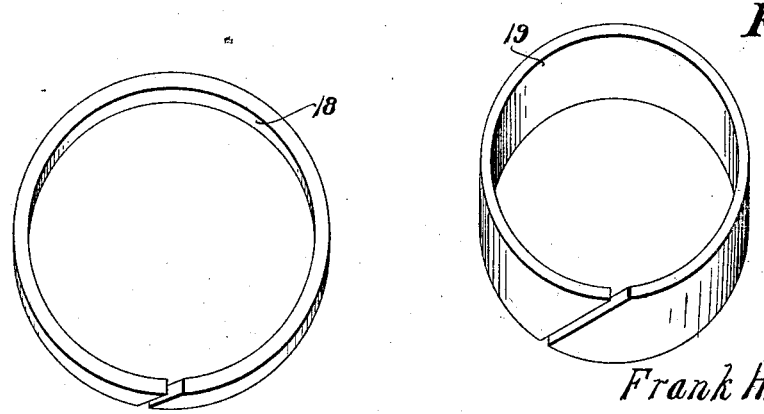
Frank H. Wood.
INVENTOR
BY Victor J. Evans.
ATTORNEY
WITNESS:

Feb. 10, 1925.
F. H. WOOD
PACKING GLAND
Filed Dec. 31, 1923  2 Sheets-Sheet 2
1,526,035
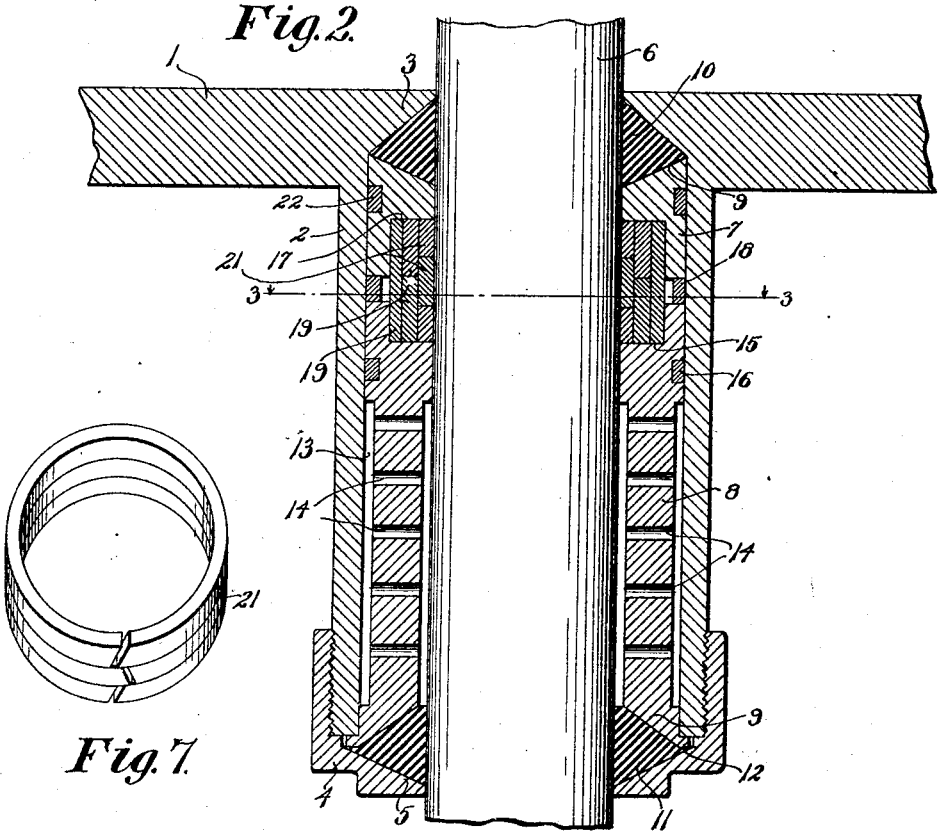
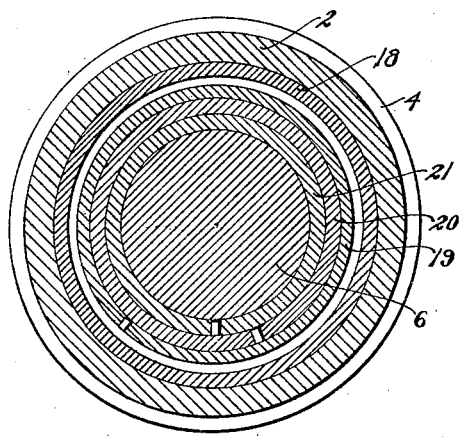
Frank H. Wood.
INVENTOR Patented Feb. 10, 1925.

1,526,035

UNITED STATES PATENT OFFICE.

FRANK H. WOOD, OF ITHACA, NEW YORK, ASSIGNOR OF ONE-HALF TO FRED C. BARNARD, OF ITHACA, NEW YORK.

PACKING GLAND.

Application filed December 31, 1923. Serial No. 683,835.

*To all whom it may concern:*

Be it known that I, FRANK H. WOOD, a citizen of the United States, residing at Ithaca, in the county of Tompkins and State of New York, have invented new and useful Improvements in Packing Glands, of which the following is a specification.

The object of this invention is the provision of a packing gland for double acting engines, pumps, etc., which will insure a fluid-tight joint between the cylinder head of the engine and the piston that is movable therethrough.

A further object is to produce a packing gland in which the part movable therethrough shall be constantly lubricated.

To the attainment of the foregoing, the invention consists in the improvement as hereinafter described and definitely claimed.

In the drawings:—

Figure 1 is a sectional view through a portion of an engine cylinder head illustrating the application of the improvement.

Figure 2 is a similar view with the improvement in section.

The remaining figures illustrate the elements constituting the packing gland.

The engine cylinder head 1 is provided with the usual packing box cylinders, only one being illustrated by the drawings, and indicated by the numeral 2. The bore of the cylinder 2 is flared inwardly at its juncture with the head 1, and the lower end of the said cylinder is provided with exterior threads. For distinction the inwardly flared upper wall of the bore is indicated by the numeral 3.

Screwed on the threaded end of the cylinder there is a cap nut 4. The cap nut has its bore, inward of its threaded portion flared, as at 5, to the central opening in the head thereof, and through the said opening in the cap nut and through the openings between the bore of the cylinder and the head 1 there is received the piston rod 6.

The packing container comprises essentially two tubular body members 7 and 8 respectively. The upper section 7 is of a materially less length than that of the lower section 8. The upper member or section 8 is flared inwardly from its upper edge to the bore thereof, as indicated by the numeral 9, and this flared portion is disposed opposite the flared end 3 of the bore of the cylinder 2. The pocket provided between the portions 3 and 9 has received therein a suitable packing 10 which, of course, contacts with the piston rod 6. In a like manner, the lower end of the packing container section 8 is flared inwardly toward its bore, as indicated by the numeral 9, and the said flared portion is arranged opposite the flared portion 5 in the cap nut and forming therebetween a pocket for a packing 11. The referred to lower end of the packing container section 8 is formed with an outstanding flange 12 which is received in and rests on the wall provided by the flared bore of the cap nut 4, and this flange also underlies the cylinder 2, whereby the section 8 is held from movement.

The section 8, at a suitable distance from the flange 12 has its body portion reduced, as at 13, and the said reduced portion at preferably equi-distantly spaced intervals is provided with longitudinally arranged series of spaced apertures 14. At a slight but suitable distance above the uppermost apertures 14 the section 8 has its bore reduced for contacting engagement with the piston rod 6 and in a line with the said bore, the section 8 has its upper end formed with an annular recess 15, for a purpose which will presently be described. Below the recess 15, the section 8 is provided with an annular groove in which is seated an expansible ring 16 that contacts with the bore of the cylinder 2.

The section 7 has its lower end provided with an annular recess 17 disposed opposite the recess or pocket 15 in the section 8, but the sections 7 and 8 are held in spaced relation by an expansible ring 18 that is disposed therebetween. Inward of the ring there is arranged in the pocket provided by the recesses 15 and 17 a metal split band 19 that has its ends in contacting engagement with the opposed horizontal walls provided by the said recesses. Inward of the band, and in contacting engagement therewith there is a pair of superimposed split ring members 20 respectively, and inward of the said ring members and in contact therewith are three superimposed split piston rings 21 respectively. The rings and bands are in contacting engagement with each other, and the three rings 21 are in frictional engagement with the piston rod 6. The apertures 14 in the packing container section 8 provide ports for a lubricant which may be either oil or water so that the piston rod 6 is constantly lubricated when reciprocating through the packing box cylinder 2. Also the friction rings engaging between the packing container sections and the piston maintain a fluid-tight joint therebetween, the packings 10 and 11 also assisting in maintaining such joint. At the same time, the piston rod 6 is free to move through the packing box cylinder without undue friction.

The packing container section 7 has an outer continuous groove for the reception of a split friction ring 22 that contacts with the bore of the cylinder 2.

It is believed that the foregoing description, when taken in connection with the drawings, will fully set forth the construction of my improvement and its advantages to those acquainted with the art to which the same relates.

Having described the invention, I claim:—

The combination with a packing box cylinder having packings at the ends thereof and a rod movable therethrough, of a packing container in the packing box cylinder comprising two tubular members which receive the rod therethrough, means at the confronting ends of the tubular members forcing the outer ends of said members against the packings, and said means contacting the wall of the bore of the packing box cylinder, one of the container members being of a greater length than the other, the longer container member having its inner and outer walls circumferentially depressed to provide lubricant chambers, said chambers having communicating ports, said container members, at their confronting ends being recessed from the bore thereof to provide a pocket, split spring rings disposed in circumferential series filling the pocket, the inner rings being of a greater number than the intermediate rings, and the outer ring comprising a single member, whereby the joints between all of the rings are broken, and expansible rings let in the container members and contacting the wall of the bore of the packing box cylinder.

In testimony whereof I affix my signature.

FRANK H. WOOD.